US00RE40516E

(19) United States
(12) Reissued Patent
Parsonage et al.

(10) Patent Number: US RE40,516 E
(45) **Date of Reissued Patent: *Sep. 23, 2008**

(54) COMPOSITE ARTICLES INCLUDING A FLUOROPOLYMER BLEND

(75) Inventors: Edward E. Parsonage, St. Paul, MN (US); Thomas J. Blong, Woodbury, MN (US)

(73) Assignee: 3M Innovative Properties Company, St. Paul, MN (US)

( * ) Notice: This patent is subject to a terminal disclaimer.

(21) Appl. No.: 10/241,660

(22) Filed: Sep. 11, 2002

Related U.S. Patent Documents

Reissue of:
(64) Patent No.: 6,117,508
Issued: Sep. 12, 2000
Appl. No.: 08/884,057
Filed: Jun. 27, 1997

(51) Int. Cl.
*B32B 27/00* (2006.01)
*B32B 27/38* (2006.01)
*B32B 27/30* (2006.01)
*B32B 27/34* (2006.01)
*C08L 27/12* (2006.01)

(52) U.S. Cl. ..... 428/36.91; 428/212; 428/411.1; 428/412; 428/421; 428/422; 525/199; 525/200

(58) Field of Classification Search ..... 525/199, 525/200; 428/35.7, 36.9, 36.91, 36.93, 421, 428/422, 411.1, 412, 480, 473.5, 474.4, 500, 428/522, 523, 524
See application file for complete search history.

(56) References Cited

U.S. PATENT DOCUMENTS 2,993,875 A * 7/1961 Maddock ..... 524/520
3,190,178 A 6/1965 McKenzie ..... 88/82
3,348,312 A 10/1967 Jones ..... 33/85
3,551,025 A 12/1970 Bingham et al. ..... 350/105

(Continued)

FOREIGN PATENT DOCUMENTS

| | | |
|---|---|---|
| EP | 0 185 590 A2 | 6/1986 |
| EP | 0 523 644 A1 | 1/1993 |
| EP | 0 551 094 A1 | 7/1993 |
| WO | WO 93/01493 | 1/1993 |
| WO | WO 95/11464 | 4/1995 |
| WO | WO 95/11466 | 4/1995 |
| WO | WO 95/11943 | 5/1995 |
| WO | WO 96/18665 | 6/1996 |

OTHER PUBLICATIONS

Concise Encyclopedia of Polymer Science and Engineering, Kroschwitz (ed.), p. 1167, Oct. 1990.*
Encyclopedia of Polymer Science and Engineering, vol. 1: Additives, Aug. 1985.*
ASTM D 1556, Standard Terminology Relating to Rubber, pp. 306–316, Jan. 1996.

(Continued)

*Primary Examiner*—Ramsey Zacharia
(74) *Attorney, Agent, or Firm*—Dena M. Ehrich; C. Michael Geise

(57) ABSTRACT

A composite article is provided which includes a blend component comprising a vinylidene fluoride containing fluoropolymer and a substantially non-vinylidene fluoride containing fluoropolymer, and a component including a substantially non-fluorinated polymer having pendant amine groups intimately bonded to the blend component. Increased adhesion is observed by a greater peel strength value between the blend component and a substantially non-vinylidene fluoride containing fluoropolymer when compared to a peel strength value between a substantially non-vinylidene fluoride containing fluoropolymer and the substantially non-fluorinated polymer having pendant amine groups.

81 Claims, 1 Drawing Sheet

U.S. PATENT DOCUMENTS

| | | | | | |
|---|---|---|---|---|---|
| 3,655,727 | A | | 4/1972 | Patel et al. | 525/326.3 |
| 3,686,143 | A | | 8/1972 | Bowman | 525/150 |
| 3,712,877 | A | | 1/1973 | Patel et al. | 525/340 |
| 3,765,932 | A | * | 10/1973 | Kokubo et al. | 427/374.4 |
| 3,857,807 | A | | 12/1974 | Kometani et al. | 524/92 |
| 3,876,654 | A | | 4/1975 | Patttison | 524/113 |
| 3,933,732 | A | | 1/1976 | Schmiegel | 524/14 |
| 3,960,825 | A | * | 6/1976 | Robinson et al. | 526/206 |
| 3,962,373 | A | * | 6/1976 | Petrucelli | 525/199 |
| 4,017,344 | A | * | 4/1977 | Lorber et al. | 156/52 |
| 4,025,159 | A | | 5/1977 | McGrath | 350/105 |
| 4,233,421 | A | | 11/1980 | Worm | 525/343 |
| 4,252,859 | A | * | 2/1981 | Concannon et al. | 428/422 |
| 4,259,463 | A | | 3/1981 | Moggi et al. | 525/331 |
| 4,335,238 | A | | 6/1982 | Moore et al. | 526/254 |
| 4,347,487 | A | * | 8/1982 | Martin | 333/1 |
| 4,423,192 | A | * | 12/1983 | Van Lang et al. | 525/199 |
| 4,501,858 | A | | 2/1985 | Moggi | 525/340 |
| 4,673,715 | A | | 6/1987 | Caywood, Jr. | 525/340 |
| 4,711,811 | A | * | 12/1987 | Randa | 428/383 |
| 4,724,092 | A | * | 2/1988 | Fukui et al. | 508/182 |
| 4,748,208 | A | | 5/1988 | Kasahara et al. | 525/151 |
| 4,749,752 | A | * | 6/1988 | Youlu et al. | 525/199 |
| 4,833,212 | A | | 5/1989 | Yamada et al. | 525/359.2 |
| 4,882,390 | A | | 11/1989 | Kolb | 525/326.3 |
| 4,896,943 | A | | 1/1990 | Tolliver et al. | 350/105 |
| 4,912,171 | A | | 3/1990 | Grootaert et al. | 525/340 |
| 4,933,060 | A | | 6/1990 | Prohaska et al. | 204/192.36 |
| 4,933,090 | A | | 6/1990 | Gill et al. | 210/700 |
| 4,935,467 | A | * | 6/1990 | Cheng et al. | 525/199 |
| 4,960,624 | A | | 10/1990 | Ueno | |
| 5,047,287 | A | | 9/1991 | Horiuchi et al. | 428/248 |
| 5,066,098 | A | | 11/1991 | Kult et al. | 359/540 |
| 5,069,964 | A | | 12/1991 | Tolliver et al. | 428/325 |
| 5,086,123 | A | | 2/1992 | Guenthner et al. | 525/276 |
| 5,170,011 | A | | 12/1992 | Martucci | 174/47 |
| 5,262,490 | A | | 11/1993 | Kolb et al. | 525/343 |
| 5,284,184 | A | | 2/1994 | Noone et al. | 138/121 |
| 5,383,087 | A | | 1/1995 | Noone et al. | 361/215 |
| 5,472,783 | A | * | 12/1995 | Mosser et al. | 428/419 |
| 5,552,199 | A | | 9/1996 | Blong et al. | 428/36.9 |
| 5,626,930 | A | | 5/1997 | Fukushi | 428/36.9 |
| 5,651,121 | A | | 8/1997 | Davies | 156/326 |
| 5,658,670 | A | | 8/1997 | Fukushi et al. | 428/421 |
| 5,718,957 | A | * | 2/1998 | Yokoe et al. | 428/36.91 |
| 5,741,855 | A | * | 4/1998 | Kaduk et al. | 525/88 |
| 5,763,068 | A | * | 6/1998 | Kishino et al. | 428/323 |
| 5,798,158 | A | * | 8/1998 | Koike et al. | 428/36.9 |
| 5,942,201 | A | * | 8/1999 | Hartmann | 423/244.01 |
| 6,790,912 | B2 | * | 9/2004 | Blong | 525/197 |

OTHER PUBLICATIONS

ASTM D 1876, Standard Test Method for Peel Resistance of Adhesives (T–Peel Test)[1], Jan. 1995.

Billmeyer, Jr., "Fluorine–Containing Polymers", *Textbook of Polymer Science*, 3rd Edition, John Wiley & Sons, pp. 398–406, Jan. 1984.

"Elastomers, Synthetic (Fluorocarbon)", *Encyclopedia of Chemical Technology*, 4th Edition, vol. 8, pp. 99–1005.

"Elastomers, Synthetic (Fluorinated)", *Encyclopedia of Chemical Technology,* 3rd Edition, vol. 8, 1979, pp. 500–515.

"Fluorine Compounds, Organic", Encyclopedia of Chemical Technology, 3rd Edition, vol. 11, 1980, pp. 20–21, 32–33, 40–41, 50, 52, 62, 70–71.

Brullo, "Fluoroelastomer rubber for automotive", *Automotive Elastomers & Design*, Jun. 1985.

Brullo, "Fluoroelastomers Seals Up Automotive Future", *ME* , Oct. 1988, pp. 36–40.

* cited by examiner

COMPOSITE ARTICLES INCLUDING A FLUOROPOLYMER BLEND

Matter enclosed in heavy brackets [ ] appears in the original patent but forms no part of this reissue specification; matter printed in italics indicates the additions made by reissue.

BACKGROUND OF THE INVENTION

Fluoropolymers, or fluorine-containing polymers, are a commercially important class of materials. Fluoropolymers include, for example, crosslinked fluorocarbon elastomers and semi-crystalline or glassy fluorocarbon plastics. Fluorocarbon plastics (or fluoroplastics) are generally of high thermal stability and are particularly useful at high temperatures. They also exhibit extreme toughness and flexibility at very low temperatures. Many of these fluoroplastics are almost totally insoluble in a wide variety of solvents and are generally chemically resistant. Some have extremely low dielectric loss and high dielectric strength and many have unique nonadhesive and low-friction properties. See, for example, F. W. Billmeyer, Textbook of Polymer Science, 3rd ed., pp. 398–403, John Wiley & Sons, New York (1984).

Fluorocarbon elastomers, particularly the copolymers of vinylidene fluoride with other ethylenically unsaturated halogenated monomers, such a hexafluoropropene, have particular utility in high temperature applications, such as seals, gaskets, and linings. See, for example, R. A. Brullo, "Fluoroelastomer Rubber for Automotive Applications," Automotive Elastomer & Design, June 1985, "Fluoroelastomer Seal Up Automotive Further," Materials Engineering, October, 1988, and W. M. Grootaert, et al., "Fluorocarbon Elastomers," Kirk-Othmer, Encyclopedia of Chemical Technology, Vol. 8, pp. 990–1005 (4th ed., John Wiley & Sons, 1993).

Fluoroplastics, particularly polychlorotrifluoroethylene, polytetrafluoroethylene, copolymers of tetrafluoroethylene, hexafluoropropylene, perfluoropropyl vinyl ether and poly (vinylidene fluoride), have numerous electrical, mechanical, and chemical applications. Fluoroplastics are useful, for example, in wire coatings, electrical components, seals, solid and lined pipes, and piezoelectric detectors. See, for example, "Organic Fluorine Compounds," Kirk-Othmer, Encyclopedia of Chemical Technology, Vol. 11, pp., 20, 21, 32, 33, 40, 41, 50, 52, 62, 70, 71 (John Wiley & Sons, 1980).

In the automotive industry, for example, increased concern with evaporative fuel standards has led to the need for fuel system components that have improved barrier properties. This helps reduce the permeation of fuel vapors through automotive elements such as fuel filter lines, fuel supply lines, fuel tanks, and other elements of an automobile fuel system. Multi-layer tubing and other articles containing a fluorinated layer have been used in such automotive elements to provide a chemically resistant permeation barrier. Multi-layer articles are also useful in a number of other industries including, for example, the chemical processing and/or handling industries, and the electrical and electronics industries. Such multi-layer articles can include one or more other layers that can add strength, rigidity, or other mechanical properties.

Multi-layer compositions comprising a fluorinated polymer layer and a polyamide or polyolefin layer are known. See, for example, U.S. Pat. No. 4,933,090 (Krevor) which discloses laminate tubular articles that can include layers of fluorocarbon elastomers, and International Publication No. WO 93/1493 (LaCourt) which discloses a laminar film structure that includes a polyimide and a fluoropolymer.

To be useful, these multi-layer articles should not delaminate during use. That is, the adhesive bond strength between the layers of the multi-layer article should be sufficient to prevent the layers from separating. A variety of methods have been employed to increase the bond strength between a layer comprising a fluoropolymer and a layer comprising a substantially non-fluorinated polymer. For example, a layer of adhesive can be added between the two layers. However, the adhesive used must not limit the performance of the multi-layer article.

As an alternative to, or in addition to, adhesives, surface treatment of one or both of the layers has been used to increase the adhesive bond strength between the layers. For example, layers comprising a fluoropolymer have been treated with a charged gaseous atmosphere followed by application of a layer of thermoplastic polyamide. Such surface treatments add additional steps and cost to the manufacturing process and are limited to non-coextrusion processes.

In another approach, the adhesion between a substantially non-fluorinated polymer and a fluoropolymer, wherein the fluoropolymer is derived from vinylidene fluoride (VDF), and optionally hexafluoropropylene (HFP), has been found to increase upon exposure of the fluoropolymer to an amine compound. An example includes providing a fluoropolymer comprising interpolymerized units derived from vinylidene fluoride, a layer of a melt-processable, substantially non-fluorinated polymer, and a melt-processable aliphatic di- or polyamine of less than 1,000 molecular weight. Unfortunately, fluoropolymer derived from VDF are relatively susceptible to chemical attack by basic materials, thus rendering them unacceptable in certain chemical applications.

In contrast, fluoropolymers derived from fluorinated monomers that include substantially no VDF are known to be more chemically inert than fluoropolymer derived from VDF monomers, and are more resistant to chemical attack. Thus, such fluoropolymers are ideal for use in composite applications (e.g., articles having multi-layers) where a more resistant barrier layer is desired, such as automotive hose applications. Such articles combine the chemical resistance of the fluoropolymer with the structural properties of a generally thicker and lower cost hydrocarbon material. Examples of such substantially non-VDF derived fluoropolymers include fluoropolymers derived from monomers of tetrafluoroethylene (TFE), hexafluoropropylene (HFP), chlorotrifluoroethylene (CTFE), and optional non-fluorinated monomers. The chemical resistance provided by these fluoropolymers make such composite articles useful as automotive fuel lines, fuel tanks, other elements of automobile systems, as well as liners, tubing and containers in chemical processing and any other use where chemically resistant barriers are desired.

However, because of the improved chemical resistance of these substantially non-VDF derived fluoropolymers, they are also less likely to undergo adhesion-promoting reactions with amines. Although some degree of adhesion may be obtained on exposure of a substantially non-VDF containing fluoropolymer to an amine, many applications will benefit from, and may require, higher adhesion to a fluoropolymer that provides a chemically resistant barrier. Thus, poor adhesion between the non-VDF containing fluoropolymer and a hydrocarbon material makes formation of useful composite articles difficult.

What is yet needed is a composite article that includes a barrier comprising a substantially non-vinylidene fluoride containing polymer that adheres well to a substantially non-fluorinated polymeric substrate.

SUMMARY OF THE INVENTION

In accordance with the invention, one embodiment is a composite article comprising: a blend component that has first and second surfaces, and a substantially non-fluorinated polymer component adhered to the first surface of the blend component. The non-fluorinated polymer component has one or more pendant primary or secondary amine groups and provides an exposed surface. The blend component comprises (i) a vinylidene-fluoride containing fluoropolymer and (ii) a first substantially non-vinylidene fluoride containing fluoropolymer. As used herein, the term "blend" means that the polymers are mixed together. These polymers can be mixed by any conventional method, including solution mixing, melt-mixing or dispersion mixing.

It was found that this embodiment of the invention improved the adhesion between a non-VDF containing fluoropolymer component and the component consisting of a substantially non-fluorinated polymer.

In another embodiment of the invention, a composite article includes a second substantially non-fluorinated polymer component adhered to the exposed surface of the first substantially non-fluorinated polymer component.

In either of the embodiments above, the composite article may further include a component comprising a second substantially non-VDF containing fluoropolymer bonded to the second surface of the blend component.

In another embodiment of the invention, a multi-layer composite article includes in order, a first layer of a substantially non-VDF containing fluoropolymer; a second layer of a blend of a VDF containing fluoropolymer and a substantially non-vinylidene fluoride containing fluoropolymer, a third layer comprising a substantially non-fluorinated polymer having pendant amine groups, and a fourth layer comprising a substantially non-fluorinated polymer.

Another embodiment of the invention includes a method for adhering a fluorinated component to a substantially non-fluorinated component. The method comprises the steps of providing (A) the non-fluorinated polymer, (B) a blend of (i) a VDF containing fluoropolymer; and (ii) a first substantially non-VDF containing fluoropolymer and (C) a substantially non-fluorinated polymer having one or more pendant primary or secondary amine groups, and, sequentially or simultaneously, adhering the blend component (B) to the pendant amine component (C), and adhering the non-fluorinated polymer component (A) to the pendant amine component (C).

This method provides composite articles (e.g., multi-layer articles) having improved adhesive bond strength between a fluorinated component and a substantially non-fluorinated component through the inclusion of a fluoropolymer blend component. The composite article of the invention can be a shaped article, such as a sheet or film, a hose, a tube, a wire coating, a cable jacket, and a container. The invention provides composite articles suitable for use in motor vehicles, for example, as fuel-line hoses, chemical handling and processing, wire and cable applications, sheets or films, blow-molded and extruded articles such as bottles, tubes, etc. The articles of the invention are especially useful where chemical resistance and barrier properties are important.

BRIEF DESCRIPTION OF THE SEVERAL VIEWS OF THE DRAWING

The FIGS are not intended to limit the present invention. Consequently, it is understood that the specific constructions are illustrative only. In these several views, similar reference numbers refer to the same elements.

DESCRIPTION OF PREFERRED EMBODIMENTS

Figure 1:
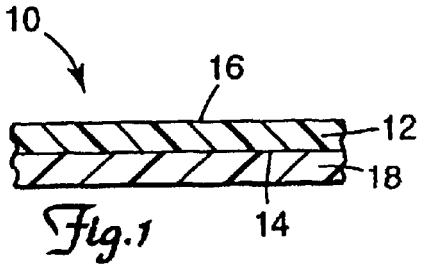
FIGS. 1–5 are cross-sectional views of various embodiments of the composite article of the invention.

The various embodiments of the invention utilize fluorinated polymers (also known as fluoropolymers). Fluoropolymers used in the invention include vinylidene fluoride containing fluoropolymers and substantially non-vinylidene fluoride containing fluoropolymers. Additionally, the fluoropolymers used in the invention include both fluoroplastics (also known as fluorothermoplastics) and fluoroelastomers.

Fluoroplastics are distinguished from fluoroelastomers or fluororubbers by their properties. Fluoroplastic materials are melt-processable and have either a melt point and are semi-crystalline, or have a glass transition temperature above ambient temperature. In contrast, fluoroelastomers or fluororubbers are generally amorphous and usually do not exhibit a melt point. While some fluoroelastomers may be melt-processable, a curing step is typically used in making finished articles of fluoroelastomers. The curing step generally results in a material with substantially reduced melt-processability. The terms fluoroelastomer and fluororubber are generally used interchangeably. See, for example, American Society for Testing and Materials (ASTM) D 1566 for elastomer and rubber definitions.

Vinylidene Fluoride Containing Fluoropolymers

As used herein the term "vinylidene fluoride containing fluoropolymer" includes fluoropolymers derived from vinylidene fluoride ("VF2" or "VDF") and fluoropolymers derived from other monomers which, when polymerized, form monomer sequences similar to polymerized vinylidene fluoride. In general, these fluoropolymers will readily dehydrofluorinate when exposed to a base. As a result, such fluoropolymers undergo relatively facile reactions with amine components. These reactions can result in improved adhesion. These other such monomers include ethylenically unsaturated monomers which, when incorporated into fluoropolymers, can produce a similar (including an identical) polymeric microstructure as the polymerized VDF. These similarly formed polymers are also prone to dehydrofluorination and a subsequent adhesion promoting reaction with an amine. In general, the microstructure of a carbon bonded hydrogen atom between carbon bonded fluorine atoms creates an amine reactive site. The reactivity of a carbon bonded hydrogen is further enhanced when its carbon atom is adjacent to, or attached to a carbon atom possessing a carbon bonded —CF3 group (supplied by HFP or 2-hydropentafluoropropylene for instance) or another electron withdrawing group. Monomers suitable for forming such carbon-bonded-hydrogen reactive sites include, but are not limited to, VDF, 1-hydropentafluoropropene, 2-hydropentafluoropropene, and trifluoroethylene.

Preferably, these VDF-containing fluoropolymers are easily prone to dehydrofluorination and are also prone to a subsequent adhesion promoting reaction with an amine. The carbon-bonded-hydrogen sites produced upon copolymerization of these monomers, including VDF, can be predehydrofluorinated (prior to blend formation) to form double bonds within the backbone of the fluoropolymer. While not wishing to be bound by any particular theory, it is believed that preformation of these double bonds may accelerate the amine adhesion promoting reaction. This dehydrofluorination reaction may also be produced in situ, e.g., during processing. This in situ dehydrofluorination reaction may be aided by the use of an appropriate catalyst, preferably of the type discussed below. Such VDF-containing fluoropolymers comprises at least 3% by weight of interpolymerized units derived from VDF or other monomers with similar reactivity when polymerized. These VDF-containing fluoropolymers may be homopolymers or copolymers with other ethylenically unsaturated monomers. More preferably, the VDF-containing fluoropolymer is formed from (i) a fluorine-containing monomer selected from the group of vinylidene fluoride, trifluoroethylene, 1-hydropentafluoropropylene, 2-hydropentafluoropropylene, mixture thereof, and optionally (ii) at least one monomer copolymerizable therewith. In one preferred embodiment, the VDF-containing fluoropolymer comprises a hexafluoropropylene-vinylidene fluoride polymer.

Such VDF-containing fluoropolymers (homopolymers, copolymers, terpolymers, etc.) can be made by well-known conventional means, for example by, free-radical polymerization of VDF with or without other ethylenically unsaturated monomers. The preparation of colloidal, aqueous dispersions of such polymers and copolymers is described, for example, in U.S. Pat. No. 4,335,238 (Moore et al.). Customary processes for making such amine-reactive fluoropolymers can include copolymerizing fluorinated olefins in aqueous, colloidal dispersions, which is carried out in the presence of water-soluble initiators which produce free radicals, such as, for example, ammonium or alkali metal persulfates or alkali metal permanganates, and in the presence of emulsifiers, such as, in particular, the ammonium or alkali metal salts of perfluorooctanoic acid.

These VDF-containing fluoropolymers useful in this invention can optionally include other useful fluorine-containing monomers such as hexafluoropropene (HFP), tetrafluoroethylene (TFE), chlorotrifluoroethylene (CTFE), 2-chloropentafluoro-propene, a fluorinated vinyl ether, including a perfluoroalkyl vinyl ether such as $CF_3OCF{=}CF_2$ or $CF_3\ CF_2\ CF_2OCF{=}CF_2$. Certain fluorine-containing di-olefins are also useful, such as, perfluorodiallyether and perfluoro-1,3-butadiene.

The VDF-containing fluoropolymers useful in this invention may also comprise interpolymerized units derived from fluorine-free, unsaturated olefin comonomers, e.g., ethylene, propylene or butadiene. Preferably, at least 50% by weight of all monomers in a polymerizable mixture are fluorine-containing. The VDF-containing fluorine-containing monomer may also be copolymerized with iodine- or bromine-containing unsaturated olefin monomer. These monomers, sometimes referred to as cure-site monomers, are useful to prepare a peroxide curable polymer. Suitable cure-site monomers include terminally unsaturated monoolefins of 2 to 4 carbon atoms such as bromodifluoroethylene, bromotrifluoroethylene, iodotrifluoroethylene, and 4-bromo-3,3,4,4-tetrafluoro-1-butene.

Useful commercially available VDF-containing fluoropolymer materials include, for example, THV 200, THV 400, THV 500G fluoropolymer (available from Dyneon LLC, St. Paul, Minn.), KYNAR 740 fluoropolymer (available from Atochem North America, Philadelphia, Pa), HYLAR 700 (available from Ausimont USA, Inc., Morristown, N.J.), and FLUOREL FC-2178 (available from Dyneon LLC).

Substantially Non-vinylidene Fluoride Containing Fluoropolymers

These fluoropolymers typically do not contain VDF monomer (or any other similar monomer) at a level such that, when polymerized, produces a microstructure which is readily susceptible to reaction with a base, as described above. Hence, these fluoropolymers are referred to herein as "substantially non-vinylidene fluoride (non-VDF) containing fluoropolymers." By "substantially non-VDF containing," it is meant that the fluoropolymer preferably is substantially free from interpolymerized units derived from VDF monomer, or other monomers which provide a microstructure similar to that described above. These fluoropolymers comprise less than 3%, preferably less than 1% by weight of interpolymerized units derived from VDF or other monomers which produce a microstructure similar to that described above.

Useful substantially non-VDF containing fluoropolymers include melt processable fluoroplastics formed from polymerizing one or more fluorine-containing monomers selected from the group of HFP, TFE, CTFE, and a fluorinated vinyl ether, and may optionally include one or more cure site monomers. Such cure site monomers are typically iodide- or bromide-containing unsaturated olefins. Preferably the cure site monomers are terminally unsaturated monoolefins that contain from 2 to 4 carbon atoms. Examples of useful cure site monomers include bromodifluoroethylene, bromotrifluoroethylene, iodotrifluoroethylene, 4-bromo-3,3,4,4-tetrafluorobutene-1, and mixture thereof. Particularly useful fluorine-containing monomers are HFP, TFE, and CTFE.

The fluorine-containing monomer used to make the non-VDF containing fluoropolymer may also be copolymerized with fluorine-free unsaturated olefin comonomers, e.g., ethylene, propylene or butadiene. Certain fluorine-containing diolefins are also useful, such as perfluorodiallyether and perfluoro-1,3-butadiene. Preferably at least 50% by weight of all monomers in a polymerizable mixture are fluorine-containing.

Additional examples of fluoroplastics useful in the invention are substantially non-VDF containing copolymers of substantially fluorinated and substantially non-fluorinated olefins. One of these substantially non-VDF containing copolymers is a terpolymer containing TFE, HFP and ethylene. For instance, a useful copolymer contains about 45 mol % to about 75 mol % of TFE units, about 10 mol % to about 30 mol % of HFP units, and about 10 mol % to about 40 mol % of ethylene units and has a melting point of about 140° C. to about 250° C.

Another example of a useful fluoroplastic in the present invention comprises interpolymerized units derived from TFE and allylic hydrogen-containing olefin monomer. International Publication No. WO 96/18665 (Greuel) describes fluoropolymers and preferred methods of producing interpolymerized units derived from TFE and polypropylene. The copolymers can generally contain, e.g., from about 2 weight percent to about 20 weight percent (preferably from about 5 weight percent to about 15 weight percent, more preferably from about 7 weight percent to about 12 weight percent) allylic hydrogen-containing olefin monomer. These semi-crystalline copolymers typically have melt temperatures so that they can be processed at temperatures below about 300° C., preferably from about 200° C. to about 250° C.

Examples of useful substantially non-VDF containing fluoropolymers of this type include poly(ethylene-co-tetrafluoroethylene), poly(tetrafluoroethylene-co-propylene), poly(chlorotrifluoroethylene-co-ethylene), and the terpolymer poly(ethylene-co-tetrafluoroethylene-co-hexafluoropropylene), as well as perfluorinated melt processable plastics, among others. Also, many useful substantially non-VDF containing fluoropolymer materials are commercially available, for example from Dyneon, LLC, St. Paul, Minn., under the trade designations X6810, and X6820, from Daikin America, Inc., Dacatur, Ala., under the trade designations NEOFLON EP-541, EP-521, and EP-610, from Asahi Glass Co., Tokyo, Japan, under the trade designations AFLON COP C55A, C55AX, C88A, and from DuPont, Wilmington, Del., under the trade designations TEFZEL 230 and 290.

Many ways to make such polymers (including copolymers, terpolymers, etc.) are known. Such methods include, but are not limited to, suspension free-radical polymerization or conventional emulsion, which typically involve polymerizing monomers in an aqueous medium in the presence of an inorganic free-radical initiator system and surfactant or suspending agent. In general, the desired olefinic monomers can be copolymerized in an aqueous colloidal dispersion in the presence of water-soluble initiators which produce free radicals such as, for example, ammonium or alkali metal persulfates or alkali metal permanganates, and in the presence of emulsifiers such as, in particular, ammonium or alkali metal salts of perfluorooctanoic acid. See, for example, U.S. Pat. No. 4,335,238.

The substantially non-VDF containing fluoropolymers are comprised of essentially fluorinated and essentially non-fluorinated olefins. They can be prepared using a fluorinated sulfinate as a reducing agent and a water soluble oxidizing agent capable of converting the sulfinate to a sulfonyl radical. Preferred oxidizing agents are sodium, potassium, and ammonium persulfates, perphosphates, perborates, and percarbonates. Particularly preferred oxidizing agents are sodium, potassium, and ammonium persulfates.

Aqueous emulsion and suspension polymerizations can be carried out in conventional steady-state conditions in which, for example, monomers, water, surfactants, buffers and catalysts are fed continuously to a stirred reactor under optimum pressure and temperature conditions while the resulting emulsion or suspension is removed continuously. An alternative technique is batch or semibatch polymerization by feeding the ingredients into to stirred reactor and allowing them to react at a set temperature for a specified length of time or by charging ingredients into the reactor and feeding the monomer into the reactor to maintain a constant pressure until a desired amount of polymer is formed.

Blend Component

The blend component used in the invention includes the VDF containing fluoropolymer and a substantially non-VDF containing fluoropolymer, each described above. The blend component includes the VDF-containing fluoropolymer in an amount from preferably about 5 wt. %, to about 75 wt. %, and more preferably about 10 wt. % to preferably about 50 wt. %. The blend component also includes the substantially non-VDF containing fluoropolymer in an amount from preferably about 25 wt. %, to about 95 wt. %, and more preferably about 50 wt. % to about 90 wt. %.

Blends of the VDF-containing fluoropolymer and the substantially non-VDF containing fluoropolymer may be formed by a variety of known techniques. These include melt mixing these fluoropolymers either by a batch mixing technique or a continuous extrusion process. Mixing and coating of fluoropolymer dispersions, followed by thermal annealing, may also be used to form the blend component. Of course, material selection and choice of process may be determined by the end use requirements as well as melt viscosity ratios between the components.

When employing the blend component in the composite article, increased adhesion is observed by a greater peel strength value between the blend component and the component including a substantially non-fluorinated polymer containing pendant amine groups when compared to a peel strength value between a component consisting of a substantially non-VDF containing fluoropolymer and a component consisting of a substantially non-fluorinated polymer having pendant amine groups. This is particularly significant in applications where long durability of a composite article is required, such as in automobile fuel line where a fuel hose is continually exposed to petrochemicals (e.g., fuel).

Substantially Non-Fluorinated Polymers

It is contemplated that the invention may also include a substantially non-fluorinated thermoplastic or elastomeric polymer component bonded to the component comprising a polymer having pendant amine groups. Typically, this is opposite the blend component. The substantially non-fluorinated polymer component can provide added structural integrity and reduced cost, among other things.

Useful substantially non-fluorinated materials can include any of a number of well known, substantially non-fluorinated polymers. As used herein the term "substantially non-fluorinated" refers to polymers and polymeric materials having fewer than 10 percent of their carbon-bonded hydrogen atoms replaced with fluorine atoms. Preferably, the substantially non-fluorinated polymer has fewer than 2 percent of its carbon-bonded hydrogen atoms replaced with fluorine atoms, and more preferably fewer than 1 percent of its carbon-bonded hydrogen atoms are replaced with fluorine atoms.

Preferred substantially non-fluorinated polymers include thermoplastic polymers such as polyamides, polyimides, polyurethanes, polyolefins, polystyrenes, polyesters, polycarbonates, polyketones, polyureas, polyacrylates and polymethacrylates. The particular substantially non-fluorinated polymer selected will depend upon the application or desired properties.

Polyamides useful as the substantially non-fluorinated polymer are generally commercially available. For example, polyamides such as any of the well-known nylons are available from a number of sources. Particularly preferred polyamides are nylon-6, nylon-6,6, nylon-11, or nylon-12. It should be noted that the selection of a particular polyamide material should be based upon the physical requirements of the particular application for the resulting article. For example, nylon-6 and nylon-6,6 offer higher heat resistant properties than nylon-11 or nylon-12, whereas nylon-11 and nylon-12 offer better chemical resistant properties. In addition to those polyamide materials, other nylon materials such as nylon-6,12, nylon-6,9, nylon-4, nylon-4,2, nylon-4,6, nylon-7, and nylon-8 may also be used. Ring containing polyamides, e.g., nylon-6, T and nylon-6,1, may also be used. Polyether containing polyamides, such as PEBAX polyamides (Atochem North America, Philadelphia, Pa.), may also be used.

Useful polyurethane polymers include aliphatic, cycloaliphatic, aromatic, and polycyclic polyurethanes. These polyurethanes are typically produced by reaction of a polyfunctional isocyanate with a polyol according to well known reaction mechanisms. Useful diisocyanates for employment in the production of a polyurethane include dicyclohexylmethane4,4'-diisocyanate, isophorone diisocyanate, 1,6-hexamethylene diisocyanate, cyclohexyl diisocyanate, and diphenylmethane diisocyanate. Combinations of one or more polyfunctional isocyanates may also be used. Useful polyols include polypentyleneadipate glycol, polyetramethylene ether glycol, polyethylene glycol, polycaprolactone diol, poly-1,2-butylene oxide glycol, and combinations thereof. Chain extenders, such as butanediol or hexanediol, may also optionally be used in the reaction. Commercially available urethane polymers useful in the present invention include: PN-3429 from Morton International, Inc., Seabrook, N.H., and X-4107 from B.F. Goodrich Company, Cleveland, Ohio.

The polyolefin polymers useful as the substantially non-fluorinated polymer are generally homopolymers or copolymers of ethylene, propylene, acrylic monomers, or other ethylenically unsaturated monomers, for example, vinyl acetate and higher alpha-olefins. Such polymers and copolymers can be prepared by conventional free-radial polymerization or catalysis of such ethylenically unsaturated monomers. The degree of crystallinity of the hydrocarbon polymer or copolymer can vary. The polymer may, for example, be a semi-crystalline high density polyethylene or may be an elastomeric copolymer of ethylene and propylene. Carboxyl, anhydride, or imide functionalities may be incorporated into the hydrocarbon polymer within the present invention, by polymerizing or copolymerizing functional monomers, for example, acrylic acid or maleic anhydride, or by modifying a polymer after polymerization, for example, by grafting, by oxidation or by forming ionomers. These include, for example, acid modified ethylene vinyl acetates, acid modified ethylene acrylates, anhydride modified ethylene acrylates, anhydride modified ethylene vinyl acetates, anhydride modified polyethylenes, and anhydride modified polypropylenes. The carboxyl, anhydride, or imide functional polymers useful as the hydrocarbon polymer are generally commercially available. For example, anhydride modified polyethylenes are commercially available from DuPont, Wilmington, Del., under the trade designation BYNEL coextrudable adhesive resins.

Polyacrylates and polymethacrylates useful as the substantially non-fluorinated polymer include, for example, polymers of acrylic acid, methyl acrylate, ethyl acrylate, acrylamide, methylacrylic acid, methyl methacrylate, and ethyl acrylate, to name a few. As mentioned above, other useful substantially non-fluorinated polymers include polyesters, polycarbonates, polyketones, and polyureas. These materials are generally commercially available, for example, SELAR polyester (DuPont, Wilmington, Del.), LEXAN polycarbonates (General Electric, Pittsfield, Mass.), KADEL polyketone (Amoco, Chicago, Ill.), and SPECTRIM polyurea (Dow Chemical, Midland, Mich.), Preferred substantially non-fluorinated elastomer polymers include acrylonitrile butadiene (NBR), butadiene rubber, chlorinated and chloro-suflonated polyethylene, chloroprene, EPM EPDM, epichiorohydrin (ECO), isobutylene isoprene, isoprene, polysulfide, polyurethane, silicone, PVC-NBR, styrene butadiene, and vinyl acetate ethylene. Examples of these compounds include Nipol 1052 NBR (Zeon, Louisville, Ky.), Hydrin 2000 ECO (Zeon, Louisville, Ky.), Hypalon 48 (Dupont, Wilmington, Del.), and Nordel 2760P EPDM (Dupont, Wilmington Del.).

Substantially Non-Fluorinated Polymers having Pendant Amine Groups

Useful substantially non-fluorinated polymers having pendant amine groups preferably include any of the substantially non-fluorinated polymers described above so long as a pendant amine group is provided. More preferably, these non-fluorinated polymers having pendant amine groups contain one or more primary amine groups. For example, aliphatic di-, or polyamines mixed and reacted with a substantially non-fluorinated polymeric material described above can be used in a composite article according to the invention. The term "di-, or polyamines" as used within this description refers to organic compound containing at least two amine groups. By "aliphatic" it is meant that the nitrogen atoms of at least two of the two or more amines in the compound are bonded directly to only hydrogen atoms or aliphatic carbon atoms rather than being bonded directly to aromatic moieties or functional groups (e.g., carboxyl). For example, as "aliphatic di-, or polyamine" is used within the present description, aniline and urea are not aliphatic di-, or polyamines. Secondary amines are more preferred than tertiary amines and primary amines are most preferred. These amines modify a substantially non-fluorinated polymer which makes up the component of the composite article to which the blend is adhered.

Primary-amine containing polymers are obtained, for example, by reacting carboxyl-containing hydrocarbon elastomers with diamines, for example, 2-methylpentanediamine and N-aminoethylpiperazine. Most preferred are alkylene polyamines or diamines that comprise at least two primary amines, such as hexamethylene diamine, dodecyl diamine, and 2,4,8,10-tetraoxaspiro[5,5] undecane-3,9-dipropanamine. Such polymers and copolymers can be prepared by free radical polymerization of ethylenically unsaturated monomers.

A particularly useful non-fluorinated polymer (polyamide) having pendant amine groups is commercially available under the trade designation GRILAMID FE4943, now known as GRILAMID XE3595 and GRILAMID FE5405, both available from EMS Chemie AG (Switzerland). Other materials which may be modified with the addition of pendant amine groups include polyimides, polyesters, polycarbonates, polyketones, and polyureas. These materials are generally commercially available, for example, SELAR polyester from DuPont (Wilmington, Del.), LEXAN polycarbonate (General Electric, Pittsfield, Mass.), KADEL polyketone (Amoco, Chicago, Ill.), and SPECTRIM polyurea (Dow Chemical, Midland, Mich.).

Catalysts

In addition to pendant amine functionality, other catalyst systems may be added to the amine functionalized substantially non-fluorinated polymer component to accelerate bonding to the fluoropolymer blend component. Certain catalysts may also be added to the blend component provided that they are not overly reactive with the blend component. These catalysts may include oregano-onium compounds used in conjunction with an acid acceptor.

Many of the oregano-onium compounds useful in this invention are described in the art and contain at least one heteroatom (i.e., a non-carbon atom such as N, P, S, O) bonded to organic or inorganic moieties. See, for example, U.S. Pat. No. 4,882,390 (Grootaert et al.); U.S. Pat. No. 3,655,727 (Patel et al.); U.S. Pat. No. 3,712,877 (Patel et al.); U.S. Pat. No. 3,857,807 (Kometani): U.S. Pat. No. 3,686,143 (Bowman); U.S. Pat. No. 3,933,732 (Schmiegel); U.S. Pat. No. 3,876,654 (Pattison); U.S. Pat. No. 4,233,421 (Worm); U.S. Pat. No. 4,259,463 (Moggi et al.); U.S. Pat. No. 4,673,715 (Caywood): U.S. Pat. No. 4,833,212 (Yamada et al.); U.S. Pat. No. 4,748,208 (Kasahara et al.); U.S. Pat. No. 4,501,858 (Moggi); U.S. Pat. No. 4,882,390; and also see West, A. C. and Holcomb, A. G. "Fluorinated Elastomers", Kirk-Othmer; Encyclopedia of Chemical Technolog, Vol. 8, 3rd Ed., John Wiley & Sons, Inc., pp. 500–515 (1979). Mixtures of oregano-onium compounds are also useful in this invention.

Preferably, the oregano-onium compounds include quaternary oregano-onium compounds (such as those selected from the group consisting of ammonium, arsonium, phosphonium, stibonium, amino-phosphonium, phosphorane and immium compounds) and sulfonium compounds.

Many of such compounds are described in U.S. Pat. No. 4,882,390 (Grootaert et al.).

Representative oregano-onium compounds useful in this invention include:

tetrabutylammonium chloride, tetrabutylammonium bromide, tetrahexylammonium chloride, tetraheptylammonium chloride, triphenylben-zylphosphonium chloride, tetrapentylammonium chloride, tributylallylphosphonium chloride, tributylbenzylphosphonium chloride, dibutyldiphyneylphosphonium chloride, tetrabutylphosphonium chloride and tributyl(2-methoxy)propylphosphonium chloride, phenyltrimethylammonium chloride, tetrapropylammonium bromide, tetraheptylammonium bromide, tetramethylphosphonium chloride, tetramethylammonium chloride, tetraphenylphosponium chloride, tetraphenylarsonium chloride, tetraphenylstibonium chloride, benzyltris (dimethylamino) phoisphonium chloride, bis (benzyldiphenylphosphine) iminium chloride compounds and mixtures thereof.

Acid acceptors can be inorganic or organic compounds. Organic acid acceptors include sodium stearate, magnesium oxalate, and benzotriazoate. However, acid acceptors are generally inorganic bases and include magnesium oxide, lead oxide, calcium oxide, calcium hydroxide, dibasic lead phosphite, zinc oxide, barium carbonate, strontium hydroxide, calcium carbonate, etc.

The catalysts may also include amine compounds other than the pendant amine used in the substantially non-fluorinated polymer having pendant amine groups. Representative classes of useful amine compounds include aliphatic, aryl and amidine amine compounds. Preferably the amine compound is a secondary or tertiary amine compound. Examples of these include 4-dimethyl amino pyridine, triisooctyl amine, 1,8-diazobicyclo(2,2,2)-octane, 1,5-diazobicyclo[4.3.0] non-5-ene, and 1,8-diazobicyclo [5.4.0]undec-7-ene, imidazole, benzotriazole, to name a few.

A useful class of amine compounds can be represented by the following formula:

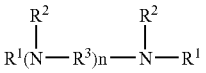

where:

$R^1$ is independently selected from substituted and unsubstituted alkyl, cycloalkyl, aryl, aralkyl, and alkaryl groups;

$R^2$ is independently selected from H, and substituted and unsubstituted alkyl, cycloalkyl, aryl, aralkyl and alkaryl groups;

$R^3$ is selected from substituted or unsubstituted alkylene, cycloalkylene, arylene, aralkylene, and alkarylene groups; n is a number from 0 to about 100.

The catalyst may be incorporated into either the blend component or the pendant amine-containing non-fluorinated polymer component. Preferably it is incorporated into the latter.

Optional Additives

The composite articles in accordance with the invention may also include optional additives, such as those typically used in other thermoplastic applications. The optional additives are preferably selected from the group of a polymer, a pigment, a tackifier, a filler, electrically conductive materials (such as those described in U.S. Pat. No. 5,552,199), electrically insulative materials, a stabilizer, an antioxidant, a lubricant, a processing aid, an impact modifier, a viscosity modifier, and mixtures thereof.

Discussion of the Drawings

The present invention, and the orientation of the previously described components within those components, will be further understood by reference to the FIGURES.

Referring first to FIG. 1, a cross-sectional view is shown of a section of a two component construction 10 according to the invention. This embodiment may comprise a film, a sheet, a tube, a wire coating, a cable jacket, a container wall, etc. Construction 10 comprises a first layer 12 having first and second surfaces 14 and 16 respectively, and a second layer 18 bonded to first surface 14.

First layer 12 comprises the blend component of the VDF-containing fluoropolymer and the substantially non-VDF containing fluoropolymer. The blend layer 12 is advantageous because it can provide a chemical barrier to the construction 10. Second layer 18 comprises the substantially non-fluorinated polymer having pendant amine groups.

Figure 2:
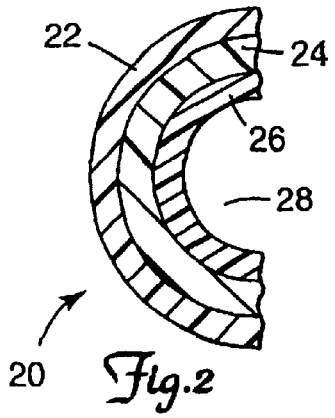

Referring now to FIG. 2, a three layer construction according to the invention is generally shown as a cross-sectional view of a tubing or a hose segment 20. The first, or outer layer or wall 22 provides structural integrity to the composite article and is made from a substantially non-fluorinated polymer. An intermediate layer 24 provides adhesion between outer layer 22 and an inner layer 26. The intermediate layer 24 comprises a substantially non-fluorinated polymer having pendant amine groups. The inner layer 26 comprises the blend of VDF-containing fluoropolymer and the first substantially non-vinylidene fluoride containing fluoropolymer. The inner (or blend) layer 26 is advantageous because it can provide a sufficient barrier for the composite article 20. In this embodiment, blend layer 26 faces cavity 28 which provides the passageway for the chemical desired in the intended use of the composite article, such as fuel or vapor lines in an automobile fuel system.

Figure 3:
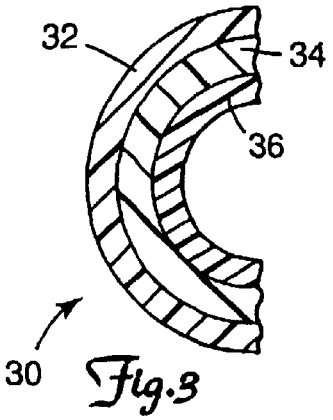

Referring now to FIG. 3, this three layer construction according to the invention comprises an outer layer 32, an intermediate layer 34 and an inner layer 36. Outer layer 32 comprises the substantially non-fluorinated polymer having pendant amine groups. The intermediate layer 34 comprises the blend of the VDF containing fluoropolymer and the non-VDF containing fluoropolymer. The inner layer 36 provides chemical and/or flame barrier to the composite article 30 and comprises the substantially non-VDF containing fluoropolymer. The composite article 30 may also be provided as a flat sheet that can be used as gaskets, seals, diaphragms, and molded articles such as containers, liners, and the like.

Figure 4:
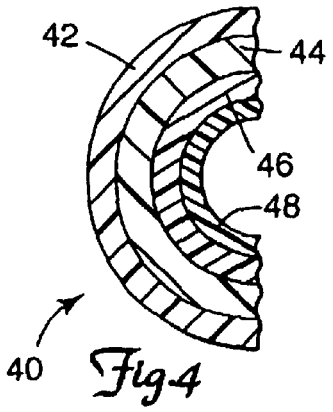

FIG. 4 illustrates a four layer embodiment of the invention. Construction 40 is generally shown as a cross-section of a tube or a hose segment, although it may also be employed in any of the other uses encompassed by this specification. Construction 40 generally comprises outer layer 42, first intermediate layer 44, second intermediate layer 46, and inner layer 48. Outer layer 42 comprises the substantially non-fluorinated polymer; first inner layer 44 the substantially non-fluorinated polymer having pendant amine groups; second inner layer 46 the blend component; and inner layer 48 the substantially non-VDF containing fluoropolymer.

Figure 5:
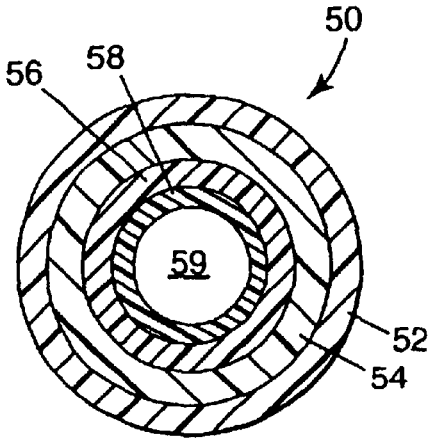

Referring to FIG. 5, another preferred embodiment of the invention is a composite article generally shown as a cross-sectional view of a coated wire/cable 50. The coated wire or cable comprises an optional outer layer 52 of a substantially non-VDF containing fluoropolymer that provides a barrier, e.g., the chemical resistance and/or electrical insulating properties to the composite article; first intermediate layer 54 of the blend component; a second intermediate layer 56 of the substantially non-fluorinated polymer having pendant amine groups; and an optional inner layer 58 of the substantially non-fluorinated fluoropolymer.

In the constructions of FIGS. 3–5, the peel strength between the blend layer (layers 34, 46, and 54 respectively) and the layer of the amine modified polymer (layers 32, 44, and 56 respectively) is greater than the peel strength that would exist between the layer of non-VDF containing fluoropolymer (layer 36, 48, and 52 respectively) and the layer of the amine modified polymer (layers 32, 44, and 56 respectively) if they were bonded directly to each other and tested under the same conditions.

In any of these embodiments, the substantially non-VDF containing fluoropolymer used in the blend layer and the fluoropolymer used in the layer providing the barrier can be the same or different substantially non-VDF containing polymer, such as those described previously. Preferably, the non-VDF containing fluoropolymers are compatible with one another. Most preferably, they are the same or similar.

In any of the embodiments of the invention, the various layers are bonded to the adjacent layer or layers. Preferably they are intimately bonded to the adjacent layer or layers. As used herein, the term "intimately bonded" means that the components or layers are not easily physically separated without substantially destroying the composite or multilayer article. Additionally, any of the embodiments contemplated by the invention can be provided in the form of a sheet or film regardless of the specific embodiment illustrated in the FIGS. Further, the order of the layer may be reversed in any of these embodiments. Determination of what comprises the inner and outer layers is influenced by where the barrier properties are desired.

Composite Article Formation

Methods known in the polymer art can be used to produce a composite article, such as a bonded multi-layer article, wherein the fluoropolymer blend component is in substantial, preferably intimate, contact with the substantially non-fluorinated polymeric material having pendant amine groups. For instance, the fluoropolymer blend component and the substantially non-fluorinated polymeric material having pendant amine groups can be formed by known methods into thin films or thicker sheets. These films or sheets can be laminated together under heat and/or pressure to form a bonded multilayer article. Alternatively, the fluoropolymer blend component and the substantially non-fluorinated polymer having pendant amine groups can be simultaneously co-extruded into a multi-layer article.

The formulation of the fluoropolymer blend component may also be accomplished during the formulation of the composite article. For instance, the non-vinylidene fluoride containing fluoropolymer and the VDF-containing fluoropolymer may be fed to and melt mixed by the same extruder being employed during the co-extrusion process.

In addition, all of these methods can be used to apply additional polymeric components or layers either before, during, or after the formation of the fluoropolymer blend component in contact with the component including the substantially non-fluorinated polymer having pendant amine groups. For instance, a component including a substantially non-vinylidene fluoride containing fluoropolymer can be applied to the fluoropolymer blend component and then a component including the substantially non-fluorinated polymer having pendant amine groups can be applied to the fluoropolymer blend layer opposite the component including a substantially non-vinylidene fluoride containing fluoropolymer. An optional component including a substantially non-fluorinated polymer can be applied adjacent to the component including the substantially non-fluorinated polymer having pendant amine groups opposite the blend component.

Conditions by which two or more components are brought together (e.g., sequential extrusion, co-extrusion or lamination, to name a few) may be sufficient to provide adequate adhesion between the components. However, it may be desirable to further treat the resulting composite article with, for example, heat and/or pressure to improve adhesion. One way to supply additional heat, for example, is to slow the rate of cooling after extrusion of the components. Also, additional heat or energy can be added during or after extrusion or lamination processes, wherein the temperatures may be higher than that required for merely processing the components. Further, the complete composite article may be held at an elevated temperature and/or pressure for an extended period of time, such as in an oven, an autoclave, a heated liquid path and the like. A combination of these methods can also be used.

The many advantages of a composite article in accordance with the invention are further illustrated in the following non-limiting examples in which all parts and percentages are given as parts and percentages by weight unless otherwise stated.

EXAMPLES

In the following Examples and Comparative Examples, various composites were prepared and the adhesion between the components, or layers, was evaluated.

The abbreviations for the materials used are defined according to the following schedule shown in Table 1.

TABLE 1

| Abbreviation | Description |
|---|---|
| VDFP (VDF-containing fluoropolymer) | a terpolymer of tetrafluoroethylene, hexafluoropropylene, and vinylidene, fluoride, commercially available from Dyneon LLC, St. Paul, MN, under the trade designation THV 50OG |
| PA (substantially non-fluorinated polymer having pendant amine groups) | an amine pendant polyamide 12, commercially available from EMS Chemie AG, Switzerland, under the trade designation GRILAMD FE 4943 |
| NF (substantially non-fluorinated polymer) | polyamide 12, commercially available from Huls America, Piscataway, NJ under the trade designation Vestamid ™ |
| FEP | a film made from perfluorinated ethylene-propylene, commercially available from DuPont |
| POLYMER 1 | a terpolymer of ethylene, tetrafluoroethylene and hexafluoropropylene, commercially available from Dyneon LLC, St. Paul, MN, under the trade designation X6820 |
| POLYMER 2 | 91% tetrafluoroethylene (TFE)-9% propylene (P) (percent by weight); $T_m$ of 205° C. |

POLYMER 2 was prepared by the method described in International Publication No. WO 96/18665 (Greuel). In particular, a 150 L vertically stirred polymerization reactor was charged with 120,000 g deionized water, 70 g KOH, 430 g $K_2HPO_4$, 694 g ammonium perfluorooctanoate, 1,023 g of a 20% solution of $C_4F_9SO_2Na$ in deionized water. The reactor was then alternately evacuated and purged with $N_2$ until the level of $0_2$ was less than about 50 ppm. The reactor was then evacuated, the temperature raised to about 71° C., and the agitation speed set about 210 rpm. Next, the reactor was charged with about 3929 g of TFE and about 79 g of propylene to give a pressure of about 15.2 bar (220 psig). The polymerization was initiated by feeding a 5% solution of $(NH_4)_2S_2O_8$ in deionized water to the reactor by means of a metering pump at approximately 25 g/minute until 1 equivalent of$(NH_4)_2S_2O_8$ was fed(about 3,200 g of solution). Upon the observation of a pressure drop, the running feed, which consisted of 91% TFE and 9% propylene, was started and continuously adjusted by the reactor's control system in order to maintain the desired pressure. The polymerization was halted by allowing agitation after 31,300 g of TFE and 3,080 g of propylene has been fed, 5 hours after start of running feed to give a calculated average reaction rate of 57 g/L-h. The reactor was then vented, cooled, and drained to isolate the latex. The resulting polymer was coagulated by adding HCl to the latex, granulated, washed six times with deionized water, and dried overnight in an oven at about 120° C.

Example 1

In Example 1, 30 g of POLYMER 1 and 10 g of VDFP were blended using a RHEOMIX 600 internal bowl mixture equipped with roller blades, available from Haake Buchler Instruments Inc., set at a temperature of 230° C. and a mixer rotor setting of 50 rpm. The pellets of the two components were added to the mixing bowl and blended for ten minutes. The internal-bowl mixed compound, i.e., the blend, was then removed from the mixer and molded at 230° C. into a sheet approximately 0.0254 cm thick using a 0.0254 cm shim stock and a Wabash Hydraulic Press Co. heated platen press.

Figure 6:
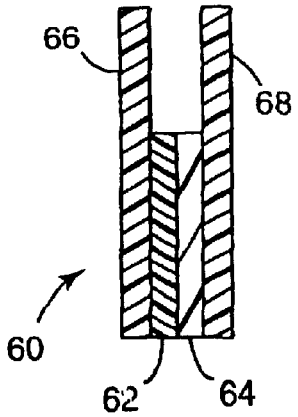
FIG. 6 is a cross-sectional view of a layered construction used in testing adhesion of a composite article in accordance with the invention.

A composite was made with 1.25 cm by 5.0 cm samples of the blend sheet and a 2.54 cm by 7.62 cm by a 0.038 cm thick extruded sheet of POLYMER 1. A 1.25 cm by 5.0 cm by 0.0254 cm thick sheet of PA was placed on the other side of the blend sheet. Finally, a sheet of 2.54 cm×7.62 cm by 0.038 cm thick sheet of NF was placed next to the PA layer given a final structure of a layer of NF, a layer of PA, a layer of the blend, and finally a layer of POLYMER 1. Referring to FIG. 6, a layered construction 60 used in testing layer adhesion is shown. The POLYMER 1 layer 66 and the NF layer 68 extended beyond the blend layer 62 and the PA layer 64 for testing purposes.

The adhesion between the layers was tested using ASTM D-1876, commonly known as a "T-peel" test. To facilitate testing via the T-peel test, a sheet of 0.00762 cm thick FEP film was placed between the POLYMER 1 layer 66 and the NF layer 68 along the edges of the shorter edges of the blend layer 62 and the amine modified polyamide layer 64 as the composite was pressed and heated. The FEP film did not adhere to either the POLYMER 1 layer 66and the NF layer 68 and was used only to create a POLYMER 1 "tab" and a NF "tab" to insert into the jaws of the test device.

Three identical composites were simultaneously heated under pressure using a Wabash Hydraulic Press Co. heated platen press at 230° C. and 686 kPa for 3 minutes. The samples were removed from the press and allowed to cool to room temperature. Peel strength or adhesion was measured on the samples in accordance with ASTM D 1876 (T-Peel test). An INSTRON Model 1125 tester, available from Instron Corp., set at a 100 mm/minute crosshead speed was used as the test drive. The peel strength was calculated as the average load measured during the peel test.

Comparative Example C1

In Comparative Example C1 a composite sample was prepared and tested as in Example 1, except that no PA layer was included between the blend layer and the NF layer.

Comparative Example C2

In Comparative Example C2 a composite sample was prepared and tested as in Example 1, except that no blend layer was used between the POLYMER 1 and the PA layer.

Examples 2 and 3 were done to evaluate a composite article of the invention where the dehydrofluorination of the VDF polymer included a catalyst.

Example 2

In Example 2, 40 g of PA was further modified by the addition of 0.4 g of Dynamar™ FM 5166 catalyst, available from Dyncon LLC (St. Paul, Minn.), and 0.4 g calcium hydroxide powder using a RHEOMIX 600 internal blow mixer equipped with roller blades, available from Haake Buchler Instruments Inc., set at a temperature of 200° C. and a mixer rotor setting of 50 rpm. The PA pellets were first melted in the mixing bowl for approximately one minute followed by the phase transfer catalyst and calcium hydroxide, and the entire composition was mixed for an additional five minutes. The internal-bowl mixed catalyzed compound was then removed from the mixer and molded at 230° C. into a sheet approximately 0.0254 cm thick using a 0.0254 cm shim stock and a Wabash Hydraulic Press Co. heated platen press. After cooling, a composite was prepared and tested as in Example 1 except the PA layer was replaced by a 1.25 cm by 5.04 cm sheet of the above described internal-blow mixed catalyzed compound containing the phosphonium calcium hydroxide catalysts.

Example 3

In Example 3, 40 g of PA was further modified by the addition of 0.2 g of 4-dimethyl amino pyridine (DMAP), available from Aldrich Chemical Co., Milwaukee, Wis., using a RHEOMIX 600 internal bowl mixer equipped with roller blades, available from Haake Buchler Instruments Inc., set at a temperature of 200° C. and a mixer rotor setting of 50 rpm. The PA pellets were first melted in the mixing bowl for approximately one minute followed by the DMAP, and the entire composition was mixed for an additional five minutes. The blend was then removed from the mixer and molded at 230° C. into a sheet approximately 0.0254 cm thick using a 0.0254 cm shim stock and a Wabash Hydraulic Press Co. heated platen press. After cooling, a composite was prepared and tested as in Example 1 except the PA layer was replaced by a 1.25 cm by 5.04 cm sheet of the above described internal-blow mixed catalyzed compound containing the DMAP catalyst.

Example 4

In Example 4, samples were prepared and tested as in Example 1, except that the blend consisted of 36 g POLYMER 1 and 4 g VDFP.

Example 5

In Example 5, samples were prepared and tested as in Example 1, except that the blend consisted of 20 g POLYMER 1 and 20 g VDFP.

Example 6

In Example 6, samples were prepared and tested as in Example 1, except that the blend consisted of 10 g of POLYMER 1 and 30 g VDFP.

The tests results of Examples 1–6 and C1–C2 are set out in Table 2.

TABLE 2

| Example | Peel Strength Value (Kg/2.54 cm) | Interface Failure |
|---|---|---|
| 1 | 28.3 | NF layer cohesive failure |
| 1 | 13.6 | blend/PA layers |
| 2 | 18.1 | blend/PA layers |
| 3 | 13.0 | blend/PA layers |
| 4 | 15.8 | blend/PA layers |
| 5 | 11.4 | blend/PA layers |
| 6 | 1.3 | blend/PA layers |
| C1 | 5.9 | blend/PA layers |
| C2 | | POLYMER 1/PA layers |

Example 7

In Example 7, 30 g of POLYMER 2 and 10 g of VDFP were blended using RHEOMIX 600 internal bowl mixer equipped with roller blades, available from Haake Buchler Instruments Inc., set at a temperature of 230° C. and a mixer rotor setting of 50 rpm. The pellets of the two components were added to the mixing bowl and blended for ten minutes. The blend was then removed from the mixer and molded at 230° C. into a sheet approximately 0.0254 cm thick using a 0.0254 cm shim stock and a Wabash Hydraulic Press Co. heated platen press.

A composite was made with 1.25 cm by 5.08 cm samples of the blend film and a 2.54 cm by 7.62 cm by 0.038 cm thick sheet of POLYMER 2. A 1.25 cm by 5.0 cm by 0.0254 cm thick sheet of PA, was placed on the other side of the blend sheet. Finally, a sheet of 2.54 cm×7.62 cm by 0.0381 cm thick NF was placed adjacent to the PA sheet, giving a final structure of a layer of NF, a layer of PA, a layer of blend, and finally the layer of POLYMER 2. This layered construction was similar to that shown in FIG. 5, except that layer 80 was POLYMER 2.

Comparative Example 3

In Comparative Example 3, a sample was prepared as in Example 7, except that no POLYMER 2-VDFP fluoropolymer blend layer was used.

All Examples and Comparative Examples were tested as explained in Example 1 above. Results are reposted in Table 1. Peel Strength Values are shown and the layer interface which separated during testing is also reported.

The test results of Examples 7 and C3 are shown in Table 3.

TABLE 3

| Example | Peel Strength Value (Kg/2.54 cm) | Interface Failure |
|---|---|---|
| 7 | 1.5 | blend/PA layers |
| C3 | 0.2 | POLYMER 2/PA layers |

It is evident from the above examples and comparative examples that a composition consisting of a blend of substantially non-VDF containing fluoropolymer and a VDF containing fluoropolymer may be used to give improved adhesion of the substantially non-VDF containing fluoropolymer to a pendant amine containing non-fluorinated polymeric material.

The complete disclosures of all patents, patent applications, and publications are incorporated herein by reference as if individually incorporated. Various modifications and alterations of this invention will become apparent to those skilled in the art without departing from the scope and spirit of this invention, and it should be understood that this invention is not to be unduly limited to the illustrative embodiments set forth herein.

What is claimed is:

1. A composite article comprising:

(a) a blend component having first and second surfaces, the blend component comprising:

(i) a vinylidene fluoride containing fluoropolymer; and (ii) a substantially non-vinylidene fluoride containing fluoropolymer than is substantially free of interpolymerized units of vinylidene fluoride or microstructure sequences of a carbon bonded hydrogen atom between carbon bonded fluorine atoms; and (b) a substantially non-fluorinated polymer component adhered to the first surface of the blend component, the non-fluorinated polymer component (i) having one or more pendant primary or secondary amine groups; and (ii) providing an exposed surface.

2. The composite article of claim 1 wherein the vinylidene-fluoride containing fluoropolymer of component (a) comprises interpolymerized units of vinylidene fluoride or interpolymerized units of other monomers which, when polymerized, form a polymer microstructure sequence of a carbon bonded hydrogen atom between carbon bonded fluorine atoms.

3. The composite article of claim 1 wherein the vinylidene-fluoride containing fluoropolymer of component (a) comprises a fluoropolymer of interpolymerized units derived from (i) at least one fluorine-containing monomer selected from the group of vinylidene fluoride, trifluoroethylene, 1-hydropentafluoropropylene, 2-hydropentafluoropropylene, and, optionally, (ii) at least one monomer copolymerizable therewith.

4. The composite article of claim 3 wherein the monomer (ii) is selected from a fluorine-containing monomer, a fluorine-free, unsaturated olefin monomer, an iodine- or a bromine-containing unsaturated olefin monomer, or a combination thereof.

5. The composite article of claim 4 wherein (a) the fluorine-containing monomer is selected from the group consisting of hexafluoropropylene, tetrafluoroethylene, chlorotrifluoroethylene, a fluorinated vinyl ether, and a fluoride-containing di-olefin;

(b) the fluorine-free, unsaturated olefin monomer is selected from ethylene, propylene, or butadiene; and (c) the iodide- or bromide-containing unsaturated olefin monomer is selected from the group consisting of bromodifluoroethylene, bromotrifluoroethylene, iodotrifluoroethylene, and 4-bromo-3,3,4,4-tetrafluoro-1-butene.

6. The composite article of claim 5 wherein the fluorine containing monomer is hexafluoropropylene.

7. The composite article of claim 1 wherein the substantially non-vinylidene fluoride-containing fluoropolymer of component (a) is formed of interpolymerized units of (i) fluorine-containing monomers selected from the group consisting of hexafluoropropylene, tetrafluoroethylene, chlorotrifluoroethylene, a fluorinated vinyl ether, and combinations thereof, and optionally, (ii) a fluorine-free unsaturated olefin comonomers, and optionally, (iii) an iodine- or bromine-containing unsaturated olefin monomer.

8. The composite article of claim 7 wherein the fluorine-free unsaturated olefin monomer is selected from ethylene, propylene, or butadiene, and the iodine- or bromine-containing unsaturated olefin monomer is selected from bromodifluoroethylene, bromotrifluoroethylene, iodotrifluoroethylene, or 4-bromo-3,3,4,4-tetrafluoro-1-butene.

9. The composite article of claim 7 wherein the substantially non-vinylidene fluoride-containing fluoropolymer of component (a) is formed of interpolymerized units of tetrafluoroethylene and at least one other monomer selected from the group consisting of hexafluoropropylene, a fluorinated vinyl ether, ethylene, and propylene.

10. The composite article of claim 1 wherein the component (b) is selected from a polyamide, a polyimide, a polyurethane, a polyolefin, a polystyrene, a polyester, a polycarbonate, a polyketone, a polyurea, a polyarcylate, or a polymethacrylate.

11. The composite article of claim 1 wherein the component (b) is an elastomer.

12. The composite article of claim 1 wherein the pendant amine group is a primary amine group.

13. The composite article of claim 1 wherein the blend component comprises about 5% by weight to about 75% by weight of the vinylidene fluoride containing fluoropolymer, and about 25% by weight to about 95% by weight of the substantially non-vinylidene fluoride containing fluoropolymer.

14. The composite article of claim 1 wherein the blend component comprises about 10% by weight to about 75% by weight of the vinylidene fluoride containing fluoropolymer, and about 25% by weight to about 90% by weight of the substantially non-vinylidene fluoride containing fluoropolymer.

15. The composite article of claim 1 wherein the blend component comprises about 10% by weight to about 50% by weight of the vinylidene fluoride containing fluoropolymer, and about 50% by weight to about 90% by weight of the substantially non-vinylidene fluoride containing fluoropolymer.

16. The composite article of claim 1 which is shaped.

17. The composite article of claim 16 selected from the group of a wire coating, a tube, a container, a sheet, a cable jacket, and a film.

18. The composite article of claim 1 further comprising (c) a second substantially non-fluorinated polymer component adhered to the exposed surface of the component (b).

19. The composite article of claim 18 wherein the component (c) is selected from a polyamine, a polyimide, a polyurethane, a polyolefin, a polystyrene, a polyester, a polycarbonate, a polyketone, a polyurea, a polyacrylate, or a polymethacrylate.

20. The composite article of claim 18 wherein the component (c) is an elastomer.

21. The composite article of claim 18 wherein the component (c) is a polyamide.

22. The composite article of claim 18 further comprising (d) a fourth component comprising a second substantially non-vinylidene fluoride containing fluoropolymer that is substantially free of interpolymerized units of vinylidene fluoride or microstructure sequences of a carbon bonded hydrogen atom between carbon bonded fluorine atoms adhered to the second surface of the blend component (a).

wherein a peel strength value between the blend component (a) and the component (b) is greater than a peel strength value between the component (d) and the component (b).

23. The composite article of claim 22 wherein the second substantially non-vinylidene fluoride-containing fluoropolymer of component (d) is formed of interpolymerized units of (i) fluorine-containing monomers selected from the group consisting of hexafluoropropylene, tetrafluoroethylene, chlorotrifluoroethylene, a fluorinated vinyl ether, and combinations thereof, and optionally, (ii) a fluorine-free unsaturated olefin comonomer, and optionally, (iii) an iodine- or bromide-containing unsaturated olefin monomer.

24. The composite article of claim 23 wherein the fluorine-free unsaturated olefin monomer is selected from ethylene, propylene, or butadiene, and the iodide- or bromide-containing olefin monomer is selected from bromodifluoroethylene, bromotrifluoroethylene, iodotrifluoroethyene, 4-bromo-3,3,4,4-tetrafluoro-1-butene.

25. The composite article of claim 23 wherein the second substantially non-vinylidene fluoride-containing fluoropolymer of component (d) is formed of interpolymerized units of tetrafluoroethylene and at least one other monomer selected from the group consisting of hexafluoropropylene, a fluorinated vinyl ether, ethylene, and propylene.

26. The composite article of claim 22 further comprising:

(c) a second substantially non-fluorinated polymer component adhered to the exposed surface of the component (b).

27. The composite article of claim 26 further comprising additives in at least one of the components.

28. The composite article of claim 22 further comprising additives in at least one of the components.

29. The composite article of claim 18 further comprising additives in at least one of the components.

30. A composite article comprising:

(a) a blend component having first and second surfaces, the blend component comprising:
  (i) a vinylidene fluoride containing fluoropolymer; and
  (ii) a substantially non-vinylidene fluoride containing fluoropolymer that is substantially free of interpolymerized units of vinylidene fluoride or microstructure sequences of a carbon bonded hydrogen atom between carbon bonded fluorine atoms; and (b) a substantially non-fluorinated polymer component adhered to the first surface of the blend component, the non-fluorinated polymer component
  (i) having one or more pendant primary or secondary amine groups; and
  (ii) providing an exposed surface, and (c) a catalyst.

31. The composite article of claim 30 wherein the catalyst comprises a combination of an oregano-onium compound and an acid acceptor.

32. The composite article of claim 30 wherein the catalyst comprises an amine compound selected from an aliphatic, aryl, or amidine amine compound.

33. The composite article of claim 30 wherein the catalyst is selected from the group consisting of (i) an oregano-onium compound and an acid acceptor, and (ii) an amine compound.

34. The composite article of claim 33 wherein the catalyst is the oregano-onium compound and the acid acceptor.

35. The composite article of claim 33 wherein the catalyst is the amine compound.

36. The composite article of claim 35 wherein the amine compound is selected from an aliphatic, aryl, or amidine amine.

37. The composite article of claim 30 wherein the catalyst is present in component (a).

38. The composite article of claim 30 wherein the catalyst is present in component (b).

39. A multi-layer polymer article comprising, in order:

a first layer of a substantially non-vinylidene fluoride containing fluoropolymer that is substantially free of interpolymerized units of vinylidene fluoride or microstructure sequences of a carbon bonded hydrogen atom between carbon bonded fluorine atoms;

a second layer comprising blend of (i) a vinylidene fluoride containing fluoropolymer; and (ii) a substantially non-vinylidene fluoride containing fluoropolymer that is substantially free of interpolymerized units of vinylidene fluoride or microstructure sequences of a carbon bonded hydrogen atom between carbon bonded fluorine atoms;

a third layer comprising a substantially non-fluorinated polymer having one or more pendant primary or secondary amine groups; and a fourth layer comprising a substantially non-fluorinated polymer; wherein a peel strength between the second layer and the third layer is greater than a peel strength between the first layer and the third layer.

40. The shaped composite article of claim 39.

41. The shaped article of claim 40 selected from a sheet, a hose, a tube, a wire coating, a cable jacket, and a container.

*42. A blend component having first and second surfaces, the blend component comprising:*

*(i) a vinylidene fluoride containing fluoroplastic copolymer, wherein 22% by weight to 36% by weight of the interpolymerized units are derived from at least one fluorine-containing monomer selected from the group of vinylidene fluoride, trifluoroethylene, 1-hydropentafluoropropylene, and 2-hydropentafluoropropylene, and wherein at least one comonomer in the copolymer is HFP; and*

*(ii) a substantially non-vinylidene fluoride containing fluoroplastic consisting of the polymerization product of one or more fluorine containing monomers selected from HFP, TFE, a fluorinated vinyl ether, and cure site monomers.*

*43. The blend component of claim 42 wherein the substantially non-vinylidene fluoride containing fluoroplastic consists essentially of interpolymerized units of TFE.*

*44. The blend component of claim 42 wherein the substantially non-vinylidene fluoride containing fluoroplastic consists of interpolymerized units derived from two or more fluorine containing monomers selected from HFP, TFE, a fluorinated vinyl ether, and cure site monomers.*

*45. The blend component of claim 42 further comprising an additive selected from the group of a polymer, a pigment, a tackifier, a filler, electrically conductive materials, electrically insulative materials, a stabilizer, an antioxidant, a lubricant, a processing aid, an impact modifier, a viscosity modifier, and mixtures thereof.*

*46. The blend component of claim 42 wherein the vinylidene fluoride containing fluoroplastic comprises about 10% by weight to about 50% by weight of the blend; and the substantially non-vinylidene fluoride containing fluoroplastic comprises about 50% by weight to about 90% by weight of the blend.*

*47. The blend component of claim 42 which is shaped, the shape optionally selected from a wire coating, a tube, a container, a sheet, a cable jacket, and a film.*

*48. The blend component of claim 42, wherein about 22% by weight to about 36% by weight of the interpolymerized units of the vinylidene fluoride containing fluoroplastic copolymer are derived vinylidene fluoride.*

*49. The blend component of claim 42, wherein the vinylidene fluoride containing fluoroplastic copolymer comprises interpolymerized units derived from VDF, HFP and TFE.*

*50. The blend component of claim 42, wherein the substantially non-vinylidene fluoride containing fluoropolymer consists of the polymerization product of HFP and TFE.*

*51. A blend component having first and second surfaces, the blend component comprising:*

*(i) a vinylidene fluoride containing fluoroplastic copolymer, wherein 3% by weight to 36% by weight of the interpolymerized units are derived from fluorine-containing monomers selected from the group of vinylidene fluoride, trifluoroethylene, 1-hydropentafluoropropylene, and 2-hydropentafluoropropylene; and*

*(ii) a substantially non-vinylidene fluoride containing fluoroplastic consisting of interpolymerized units formed from polymerizing two or more monomers selected from HFP, TFE, CTFE, a fluorinated vinyl ether, and cure site monomers.*

*52. The blend component of claim 51 wherein the vinylidene-fluoride containing fluoroplastic comprises a fluoropolymer of interpolymerized units derived from (A) at least one fluorine-containing monomer selected from the group of vinylidene fluoride, trifluoroethylene, 1-hydropentafluoropropylene, and 2-hydropentafluoropropylene; and, (B) at least one monomer copolymerizable therewith, wherein the monomer (B) is selected from a fluorine-containing monomer, a fluorine-free, unsaturated olefin monomer, an iodine- or a bromine-containing unsaturated olefin monomer, or a combination thereof.*

*53. The blend component of claim 52 wherein (a) the fluorine-containing monomer is selected from hexafluoropropylene, tetrafluoroethylene, chlorotrifluoroethylene, a fluorinated vinyl ether, and a fluorine-containing di-olefin; (b) the fluorine-free, unsaturated olefin monomer is selected from ethylene, propylene, and butadiene; and (c) the iodide- or bromide-containing unsaturated olefin monomer is selected from bromodifluoroethylene, bromotrifluoroethylene, iodotrifluoroethylene, and 4-bromo-3,3,4,4-tetrafluoro-1-butene.*

*54. The blend component of claim 51 wherein the fluoroplastic (ii) consists of interpolymerized units of (a) two or more fluorine-containing monomers selected from HFP, TFE, CTFE, a fluorinated vinyl ether, and combinations thereof, and (b) at least one cure site monomer selected from an iodine- or bromine-containing unsaturated olefin monomer.*

*55. The blend component of claim 54 wherein the iodine- or bromine-containing unsaturated olefin monomer is selected from bromodifluoroethylene, bromotrifluoroethylene, iodotrifluoroethylene, and 4-bromo-3,3,4,4-tetrafluoro-1-butene.*

*56. The blend component of claim 51 further comprising an additive selected from the group of a polymer, a pigment, a tackifier, a filler, electrically conductive materials, electrically insulative materials, a stabilizer, an antioxidant, a lubricant, a processing aid, an impact modifier, a viscosity modifier, and mixtures thereof.*

*57. The blend component of claim 51 wherein the vinylidene fluoride containing fluoroplastic comprises about 10% by weight to about 50% by weight of the blend; and the substantially non-vinylidene fluoride containing fluoroplastic comprises about 50% by weight to about 90% by weight of the blend.*

*58. The blend component of claim 51 which is shaped, the shape optionally selected from a wire coating, a tube, a container, a sheet, a cable jacket, and a film.*

*59. The blend component of claim 51, wherein at least one monomer in the substantially non-vinylidene fluoride containing fluoroplastic is a fluorinated vinyl ether.*

*60. The blend component of claim 51, wherein about 22% by weight to about 36% by weight of the interpolymerized units of the vinylidene fluoride containing fluoroplastic copolymer are derived from at least one fluorine-containing monomer selected from the group of vinylidene fluoride, trifluoroethylene, 1-hydropentafluoropropylene, and 2-hydropentafluoropropylene.*

*61. The blend component of claim 51, wherein about 22% weight to about 36% by weight of the interpolymerized units are derived from vinylidene fluoride.*

*62. A composite article comprising:*

*(a) a blend component having first and second surfaces, the blend component consisting of:*

*(i) a vinylidene fluoride containing fluoroplastic copolymer, wherein 22% by weight to 36% by weight of the interpolymerized units are derived from fluorine-containing monomers selected from the group of vinylidene fluoride, trifluoroethylene, 1-hydropentafluoropropylene, and 2-hydropentafluoropropylene, and wherein at least one comonomer in the copolymer is HFP; and*

*(ii) a substantially non-vinylidene fluoride containing fluoroplastic that is substantially free of interpolymerized units of vinylidene fluoride or microstructure sequences of a carbon bonded hydrogen atom bonded between carbon bonded fluorine atoms; and*

*(b) a substantially non-vinylidene fluoride containing fluoroplastic component that is substantially free of interpolymerized units of vinylidene fluoride or microstructure sequences of a carbon bonded hydrogen atom bonded between carbon bonded fluorine atoms adhered to a surface of the blend component (a).*

*63. The article of claim 62 wherein the substantially non-vinylidene fluoride containing fluoroplastic in the blend component and the substantially non-vinylidene fluoride containing fluoroplastic component are the same polymer.*

*64. The article of claim 62 wherein the substantially non-vinylidene fluoride containing fluoroplastic in the blend component and the substantially non-vinylidene fluoride containing fluoroplastic component are different fluoropolymers.*

*65. The article of claim 62 wherein the substantially non-vinylidene fluoride containing fluoroplastic in component (a) and/or (b) is a perfluoropolymer.*

*66. The article of claim 65 wherein the substantially non-vinylidene fluoride containing perfluoroplastic in component (a) and/or (b) comprises interpolymerized units of TFE.*

*67. The article of claim 65 wherein the substantially non-vinylidene fluoride containing perfluoroplastic in component (a) and/or (b) consists essentially of interpolymerized units of TFE.*

*68. The article of claim 62 wherein the vinylidene-fluoride containing fluoroplastic of component (a) comprises a fluoropolymer of interpolymerized units derived from (i) at least one fluorine-containing monomer selected from the group of vinylidene fluoride, trifluoroethylene, 1-hydropentafluoropropylene, 2-hydropentafluoropropylene, (ii) HFP, and (iii) at least one additional monomer copolymerizable therewith.*

*69. The article of claim 68 wherein the monomer (iii) is selected from a fluoride-containing monomer, a fluorine-free, unsaturated olefin monomer, an iodine- or a bromine-containing unsaturated olefin monomer, or a combination thereof.*

*70. The article of claim 69 wherein (a) the fluorine-containing monomer is selected from tetrafluoroethylene, chlorotrifluoroethylene, a fluorinated vinyl ether, and a fluorine-containing di-olefin; (b) the fluorine-free, unsaturated olefin monomer is selected from ethylene, propylene, and butadiene; and (c) the iodide- or bromide-containing unsaturated olefin monomer is selected from bromodifluoroethylene, bromotrifluoroethylene, iodotrifluoroethylene, and 4-bromo-3,3,4,4-tetrafluoro-1-butene.*

*71. The article of claim 62 wherein the substantially non-vinylidene fluoride-containing fluoropolymer of component (a) is formed of interpolymerized units of (i) fluorine-containing monomers selected from hexafluoropropylene, tetrafluoroethylene, chlorotrifluoroethylene, a fluorinated vinyl ether, and combinations thereof, and optionally, (ii) a fluorine-free unsaturated olefin comonomer, and optionally, (iii) an iodine- or bromine-containing unsaturated olefin monomer.*

*72. The article of claim 71 wherein the fluorine-free unsaturated olefin monomer is selected from ethylene, propylene, and butadiene, and the iodine- or bromine-containing unsaturated olefin monomer is selected from bromodifluoroethylene, bromotrifluoroethylene, iodotrifluoroethylene, and 4-bromo-3,3,4,4-tetrafluoro-1-butene.*

*73. The article of claim 71 wherein the substantially non-vinylidene fluoride-containing fluoroplastic of component (a) is formed of interpolymerized units of tetrafluoroethylene and at least one other monomer selected from hexafluoropropylene, a fluorinated vinyl ether, ethylene, and propylene.*

*74. The article of claim 62 wherein component (b) further comprises an additive selected from a polymer, a pigment, a tackifier, a filler, electrically conductive materials, electrically insulative materials, a stabilizer, an antioxidant, a lubricant, a processing aid, an impact modifier, a viscosity modifier, and mixtures thereof.*

*75. The article of claim 62 wherein the blend component comprises about 5% by weight to about 75% by weight of the vinylidene fluoride containing fluoroplastic; and about 25% by weight to about 95% by weight of the substantially non-vinylidene fluoride containing fluoroplastic.*

*76. The article of claim 62 which is shaped, the shape optionally selected from a wire coating, a tube, a container, a sheet, a cable jacket, and a film.*

*77. The composite article of claim 62, wherein the substantially non-vinylidene fluoride containing fluoroplastic in the blend component consists essentially of the polymerization product of one or more fluorine containing monomers selected from HFP, TFE, a fluorinated vinyl ether, and cure site monomers.*

*78. A blend component having first and second surfaces, the blend component comprising:*

*(i) a vinylidene fluoride containing fluoroplastic copolymer consisting of interpolymerized units formed from*

*(a) a fluorine-containing monomer selected from the group consisting of vinylidene fluoride, trifluoroethylene, 1-hydropentafluoropropylene, 2-hydrofluoropentafluoropropylene, and combinations thereof; and*

*(b) at least one monomer copolymerizable therewith selected from the group consisting of HFP, TFE, a cure site monomer, and combinations thereof:*

*wherein 3% by weight to 36% by weight of the interpolymerized units are derived from (a); and*

*(ii) a substantially non-vinylidene fluoride containing fluoroplastic consisting of the polymerization product of one or more fluorine containing monomers selected from HFP, TFE, CTFE, and cure site monomers.*

*79. The blend component of claim 78 further comprising an additive selected from the group of a polymer, a pigment, a tackifier, a filler, electrically conductive materials, electrically insulative materials, a stabilizer, an antioxidant, a lubricant, a processing aid, an impact modifier, a viscosity modifier, and mixtures thereof.*

*80. The blend component of claim 78 wherein the vinylidene fluoride containing fluoroplastic comprises about 10% by weight to about 50% by weight of the blend; and the substantially non-vinylidene fluoride containing fluoroplastic comprises about 50% by weight to about 90% by weight of the blend.*

*81. The blend component of claim 78 which is shaped, the shape optionally selected from a wire coating, a tube, a container, a sheet, a cable jacket, and a film.*

* * * * *